United States Patent [19]

Linnér

[11] Patent Number: 5,473,860
[45] Date of Patent: Dec. 12, 1995

[54] METHOD AND APPARATUS FOR MANUFACTURING A CONTAINER FILLED WITH A PRODUCT

[75] Inventor: Hans Linnér, Kalmar, Sweden

[73] Assignee: Norden Pac Development AB, Sweden

[21] Appl. No.: 199,318

[22] PCT Filed: Sep. 2, 1992

[86] PCT No.: PCT/SE92/00602

§ 371 Date: Mar. 2, 1994

§ 102(e) Date: Mar. 2, 1994

[87] PCT Pub. No.: WO93/04845

PCT Pub. Date: Mar. 18, 1993

[30] Foreign Application Priority Data

Sep. 3, 1991 [SE] Sweden .................... 9102511

[51] Int. Cl.⁶ .............. B65B 31/02; B65B 3/04; B65B 7/28; B65B 51/20
[52] U.S. Cl. .............. 53/432; 53/433; 53/471; 53/478; 53/510; 53/511; 53/329.2; 53/373.9
[58] Field of Search .............. 53/432, 471, 433, 53/478, 510, 511, 281, 329.2, 329.3, 88, 373.9, 4 89, 319; 156/69

[56] References Cited

U.S. PATENT DOCUMENTS

| 3,102,182 | 8/1963 | Oelze et al. | 53/329.3 |
| 3,239,397 | 3/1966 | Hoyle | 53/329.3 X |
| 3,449,183 | 6/1969 | Zelnick | 53/329.3 X |
| 3,604,615 | 9/1971 | Barreman | 53/489 X |
| 3,849,971 | 11/1974 | Granseus et al. | 53/329.3 |
| 3,962,844 | 6/1976 | Gordon | 53/478 |
| 4,511,426 | 4/1985 | Linnér | 53/373.9 |
| 4,659,415 | 4/1987 | Shimokawa et al. | 53/373.9 |
| 4,957,581 | 9/1990 | Jahrig et al. | 53/373.9 |
| 4,982,555 | 1/1991 | Ingemann | 53/473 X |
| 5,305,583 | 4/1994 | Linnér | 53/329.2 X |
| 5,323,589 | 6/1994 | Linnér | 53/329.2 X |

FOREIGN PATENT DOCUMENTS

| 3904476 | 8/1989 | Germany . |
| 9114623 | 10/1991 | WIPO . |
| 9114624 | 10/1991 | WIPO . |

Primary Examiner—Horace M. Culver
Attorney, Agent, or Firm—Lerner, David, Littenberg, Krumholz & Mentlik

[57] ABSTRACT

Methods and apparatus for manufacturing containers filled with product are disclosed. The method includes partially introducing an end piece into the open end of a filled tubular container, softening the end of the container and a corresponding portion of the end piece which is to be molded, thereto, contacting a transverse end wall of the end piece with an abutment device with a flange for direct contact with the transverse end wall, cooling the abutment device with a cooling medium in order to indirectly cool the flange in order to prevent the flange from adhering to the transverse end wall, and closing the container by relatively displacing the abutment device carrying the end piece and the tubular container.

23 Claims, 2 Drawing Sheets

METHOD AND APPARATUS FOR MANUFACTURING A CONTAINER FILLED WITH A PRODUCT

TECHNICAL FIELD

The present invention relates to a method and apparatus for manufacturing a container filled with a product, the container comprising a substantially tubular body portion of thin-walled plastic or laminated plastic material and having a predetermined diameter, and a first and a second butt-weldable end-piece at a first and a second end of said body portion respectively, said second butt-weldable end-piece presenting a transverse wall of slightly less diameter than said diameter of said tubular body portion

BACKGROUND

Tubes and bottles made from thin-walled plastic or plastic laminated material are used for packaging of, for example, creams, ointments and various other viscous chemical/engineering preparations. Swedish Patent Application 8800548-3 describes an end-piece and a method for manufacturing tubes or bottles by butt-welding an end-piece in both ends of a tubular-shaped body portion of thin-walled plastic or laminated plastic material.

The advantage of manufacturing tubes or bottles in this way is that the need to transport bulky empty containers over long distances is avoided. Accordingly the method allows the private packager to produce his own tubes or bottles without comprehensive equipment.

The tube or bottle produced according to the above method can be filled with its product via its opening, after which a cap is affixed over the opening with the aid of, for example, screw threads.

In many cases, however, it is desirable to provide a container which has been sealed in a controlled environment so that the customer can confirm that the packaging is unopened. This results in enhanced quality, both for the packaging and its contents.

During production of such a sealed container it is advantageous that filling with the product occurs between the fitting of the first end-piece, preferably tubularly formed, and the second end-piece.

In the method according to said Swedish Patent Application 8800548.3 tubular-shaped body portions are located on a rotary indexing table for movement between various stations. At one station each end-piece is introduced into the upper end of a corresponding body portion by a piston to an intermediate position where it partially projects into the body portion. This partially assembled work piece is then moved to the next station where heating energy is supplied to the circumferential end region of the tube and intersecting region of the end piece. Once a temperature is attained at which the material is sufficiently soft, the work piece is advanced to the subsequent station where a piston is reapplied to push the end piece to its terminal position. Rapid cooling of the welding site is then achieved by means of passages within the piston for a cooling fluid.

Up until recently it has proved impossible to apply the end-piece with the piston in situ during heating since the rim of the end-piece upon which the piston acts is subjected to heating to between 300° C.–500° C., thereby softening the material and causing it to adhere to the piston.

A partial solution to this problem is described in PCT/SE/91/00124 claiming priority from SE 9001086-9, filed 26 Mar., 1990, both of which were published after the filing date of the present application. Said documents relate to a method and a device for controlling the temperature of a container end portion during manufacture. An end-piece is placed in a defined intermediate position where it partially projects into the open end of a tubular body. Warm gas is supplied to the body portion end region and the end of the outwardly projecting portion of the end piece in order to soften the material in these portions. The end-piece is then pushed to its terminal position in the tubular body at the same time that a cooling gas is supplied to the transverse wall of the end-piece, thereby preventing the pushing means adhering to the transverse wall.

SUMMARY OF THE INVENTION

It is therefore an object of the present invention is to provide an improved method and apparatus which permits the production of filled containers at a high rate in a one-step operation.

This object is achieved in accordance with the present invention by a method for manufacturing a container filled with a product, said container comprising a substantially tubular body portion of thin-walled plastic or laminated plastic material and having a predetermined diameter, and a first and a second butt-weldable end-piece at a first and a second end of said body portion respectively, said second butt-weldable end-piece presenting a transverse wall of slightly less diameter than said diameter of said tubular body portion, said method comprising fitting said first end-piece to said first end of the body portion;

introducing said product into said container via said second end of the body portion;

introducing said second end-piece into said second end of said body portion to an intermediate position in which said second end-piece partially projects into the body portion;

softening the plastic material of the body portion in a region about said second end and softening a region of the second end-piece through application of heat energy;

contacting said second end-piece by an abutment member of lesser diameter than said transverse wall, and pressing said second end-piece into the body portion by means of relative displacement between said abutment member and the body portion to a terminal position, whereby a cooling medium is supplied to the abutment member for preventing the abutment member from adhering to the transverse wall, which cooling medium does not directly act on said transverse wall.

The apparatus according to the present invention comprises an application device for placing an end-piece having a transverse wall of predetermined diameter in a defined intermediate position in which a first portion of said end piece partially projects into an end of a tubular body portion and a second portion of said end piece projects out of said tubular body portion;

heating means for supplying warm gas to soften plastic material in a region around said end of the body portion and to soften said second portion of the end-piece;

means including an abutment member for displacing the body portion and the end-piece relative to each other until the end-piece is in a terminal position in the body portion, wherein the abutment member has a stem portion, a disc portion of slightly less diameter than said predetermined diameter of the transverse wall of the end-piece and a flange portion arranged circumferentially around the perimeter of the disc portion, wherein means are provided for cooling the abutment member.

Since, according to the invention, the abutment means acts on the transverse wall of the end-piece which is not subjected to direct heating, and the abutment means is cooled, there is no tendency for the abutment means to adhere to the end-piece.

Cooling of an abutment means is known per se from SE-A-8704048-1. In this document, however, the container is in the form of a plastics bowl which is then provided with a sealing membrane. The sealing membrane is held on the abutment plate by means of suction and is lowered until the outer circumferential region of the membrane contacts the rim of the bowl. A circumferential electrical heating ring then contacts the membrane to effect heat-sealing of the membrane to the rim of the bowl. Due to the localized heating, the rest of the membrane is substantially unaffected by the heating operation. The abutment plate is provided with cooling means, not to prevent it adhering to the membrane but to help maintain the shape of the membrane which is affected by the heat radiating from the product within the container.

BRIEF DESCRIPTION OF THE DRAWINGS

The invention will be described in more detail in the following, with reference to the drawings in which FIGS. 1 and 2 schematically show the application of an end-piece to a tubular body portion in two steps with apparatus according to one embodiment of the present invention, and FIGS. 3 and 4 schematically show the application of an end-piece to a tubular body portion in two steps with apparatus according to a second embodiment of the present invention.

DETAILED DESCRIPTION OF PREFERRED EMBODIMENTS

Figure 1:
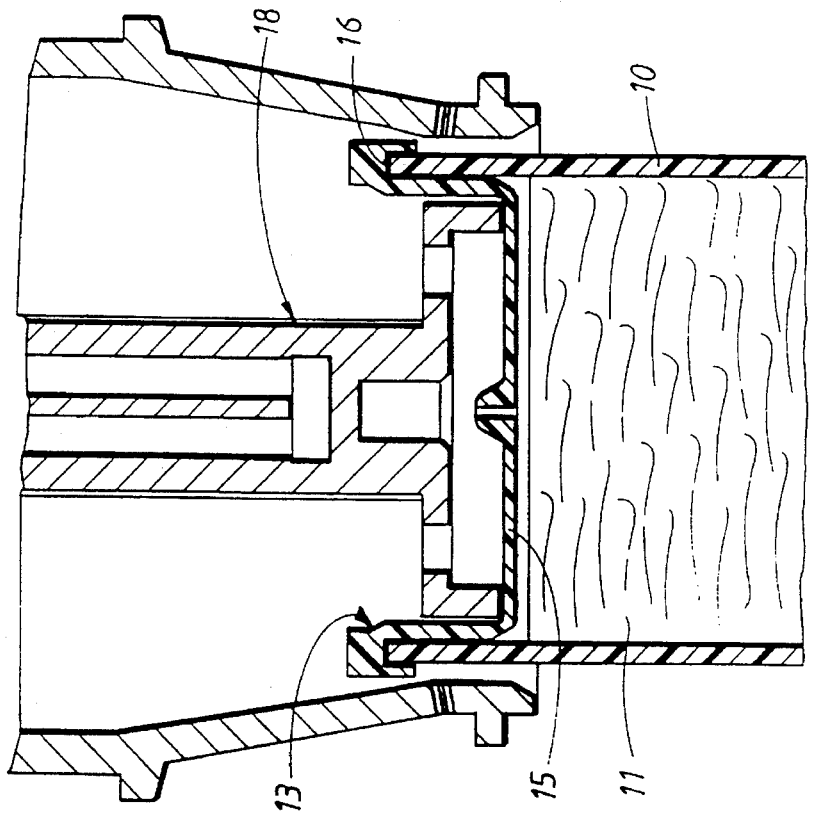

The flattenable tubular body portion 10 shown in the drawings can be made from a single-layer plastic material or from a laminate comprising a metal foil which provides the body portion with better barrier properties. The body portion can be produced by a foil butt-seam welder or, alternatively, from an extruded tube, cut to the appropriate length. Such body portions normally have a wall thickness well under 1 mm.

In the drawings only the upper end of the body portion is shown. The lower part of the body portion is already fitted with an end-piece in the form of, for example, a discharge outlet with cooperating screw cap. The body portion is filled via its open end with a product 11 to a predetermined level which corresponds to the desired quantity for the container. The body portion is now placed vertically with the opening upwards in a (not shown) cylindrical holder in a rotary indexing table which is provided with means for fitting the end-piece in the following sequence of steps.

Figure 2:
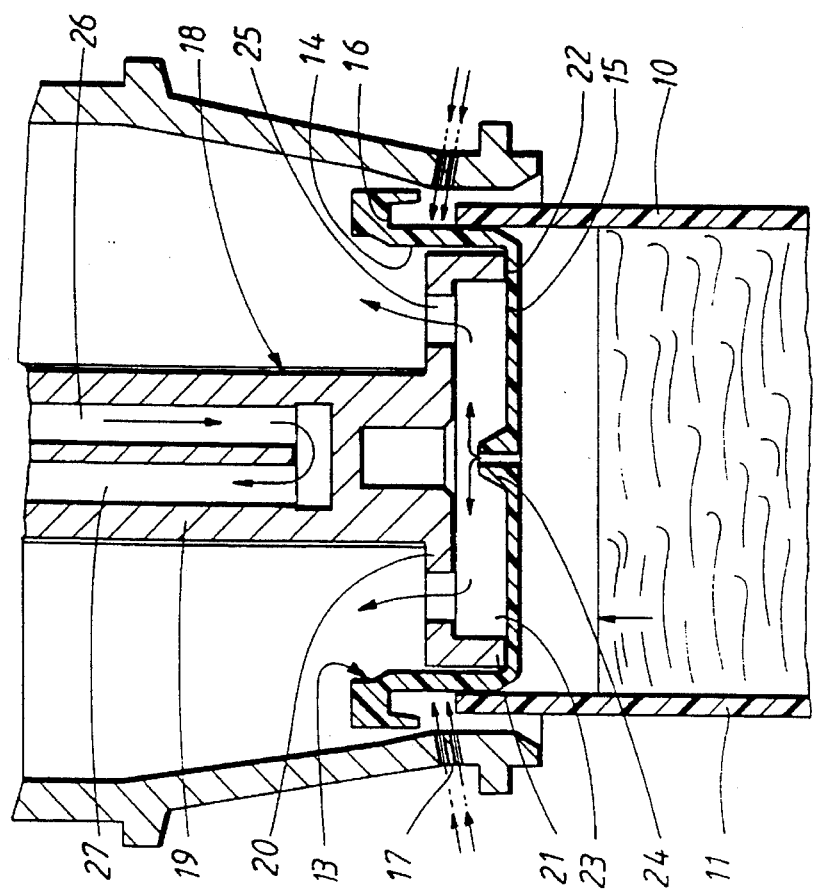
Figure 3:
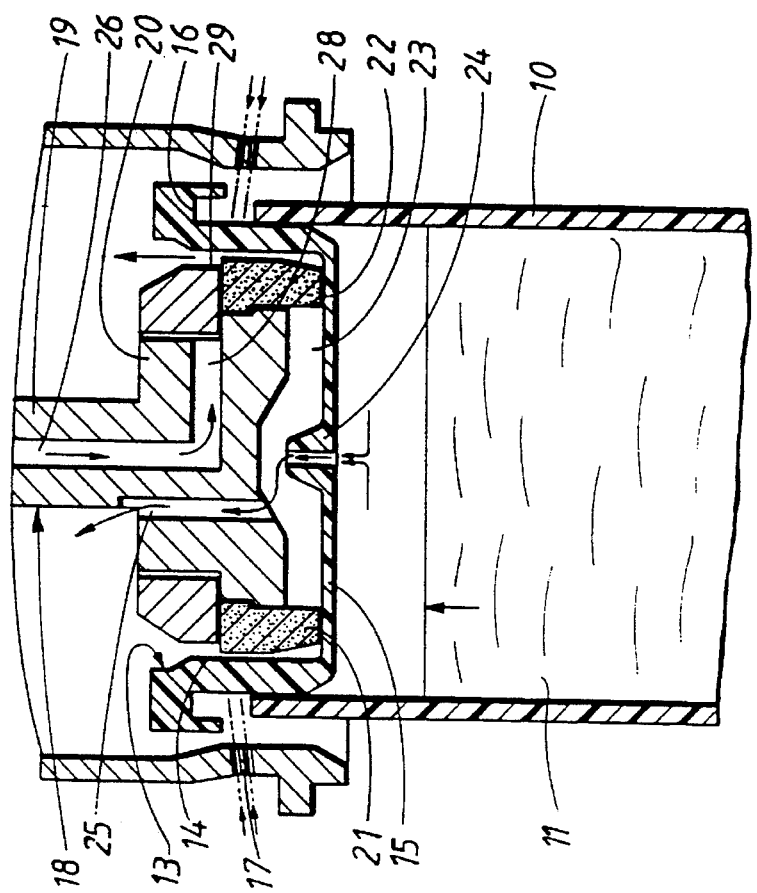

In FIGS. 1 and 3 the upper end-piece 13 has been partially introduced into the upwardly open body portion end and then advanced one stage to the welding station shown in FIGS. 1 to 4.

A suitable end-piece 13 is that which is described and claimed in PCT/SE91/00121 which was published after the filing date of the present application. This end-piece comprises a sleeve-like insert section 14 which, on the inner end, is provided with a transverse wall 15 and, on the other end, is provided by a U-shaped section 16. The insert section 14 tapers inwardly towards the transverse wall 15. The U-shaped section is provided with a groove that tapers towards the bottom of the U-shaped section.

The end-piece can, by way of example, be produced by injection-molding, whereby a barrier foil blank may be included on the inner side or the outer side of the transverse wall 15.

Figure 4:
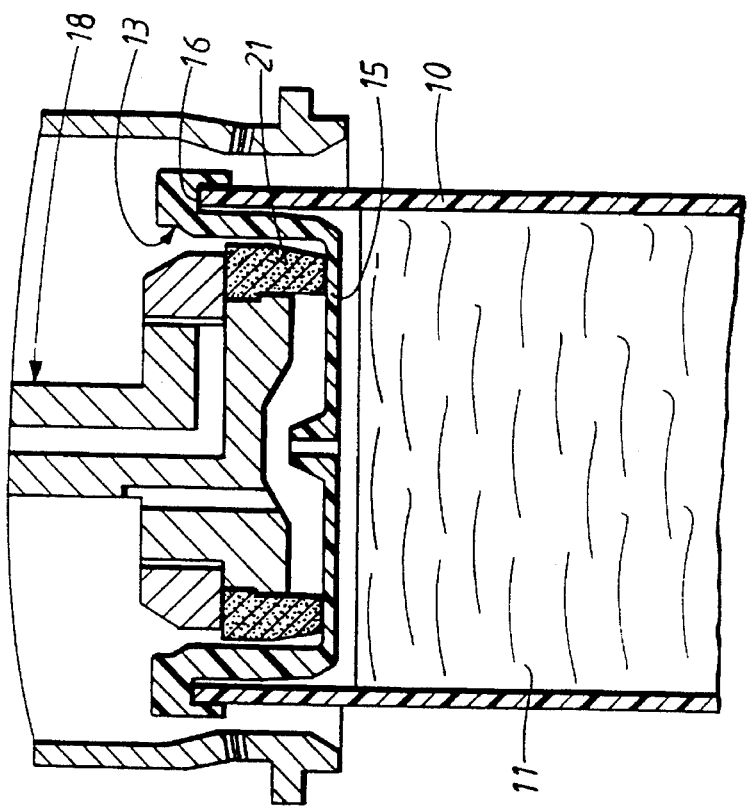

The welding station is provided with passages for supplying hot gas via directed openings 17 to the region of the body portion end edge and to the groove in the U-shaped section 16 in order to soften these regions by application of heat to a temperature between about 300°–500° C. After suitable heating, the holder is displaced upwardly in the welding apparatus so that the end-piece 13 is pressed into the tubular body portion until the rim of the body portion meets with the bottom of the groove, as shown in FIGS. 2 and 4. A central abutment member 18 of slightly smaller diameter than the transverse wall 15 serves as an abutment for the end-piece 13.

The abutment member 18 comprises a central stem portion 19 which merges into a transverse disc portion 20 generally parallel to the transverse wall 15 of the end-piece 13. The disc portion presents a diameter which is slightly less than the inner diameter of the sleeve-like insert section 14 of the end-piece such that the disc portion can be accommodated within the insert section 14. The disc portion is provided with a downwardly directed flange portion 21 around its circumference, with the end 22 of the flange portion 21 remote from the disc portion serving as the abutment surface of the abutment member 18. The depth of the flange portion 21 is chosen such that, in the abutting position shown in the drawings, an evacuation cavity 23 is created which is delimited on its lower side by the transverse wall 15 of the end-piece 13, on its upper side by the disc portion 20 of the abutment member 18 and circumferentially by the flange portion 21.

In the embodiment shown in FIGS. 1 and 2, the entire abutment member is made from the same material, for example a suitable metal. To reduce the tendency of the abutment member to stick to the transverse wall 15 of the end-piece during the heating and insertion process, the contact surface 22 of the flange portion 21 may be coated with a non-stick material such as TEFLON.

In the embodiment shown in FIGS. 3 and 4, the flange portion 21 of the abutment member 18 is made from a material different from the rest of the abutment member. This material is suitably a ceramic which may also be coated with a non-stick layer.

The purpose of the cavity 23 will now be explained. In a preferred embodiment according to the invention, the transverse wall of the end-piece 13 is provided with an evacuation nipple 24 to permit the evacuation of air from the head-space between the product 11 and the transverse wall 15 when the end-piece is pressed into the body portion end. Accordingly, the evacuation cavity 23 is in communication via at least one through hole 25 in the disc portion 20 with a vacuum source arranged to create a region of lower pressure around the stem portion 19 of the abutment member 18.

In accordance with the invention, the abutment member is provided with cooling means to prevent the abutment surface 22 adhering to the transverse wall 15 of the end-piece.

In the embodiment shown in FIGS. 1 and 2, the stem portion 19 of the abutment member 18 is provided with a conduit 26 for the supply of a cooling medium and a conduit 27 for the removal of the cooling medium. Of course, these two conduits can be formed as one continuous conduit. A suitable cooling medium may be water.

In the embodiment shown in FIGS. 3 and 4, the cooling medium is in the form of a gas, for example air, which passes along a supply conduit 26 in the stem portion 19 of the abutment member 18. The gas then flows through several radially extending cooling passages 28 in the disc portion 20 of the abutment member. The cooling gas then exits the abutment member via slots or nozzles 29 arranged circumferentially around the intersection of the disc portion 20 with the flange portion 21. The cooling gas can then mix with the air evacuated from the headspace within the container (should evacuation be chosen) and is accordingly removed via the previously mentioned vacuum source.

Once the end-piece has been heated and pushed to its terminal position within the tubular body portion, the U-shaped section 16 is compressed whilst still soft so that a seal in this region is achieved. This is performed at a subsequent station on the rotary index table and can be carried out by a vertically displaceable abutment and a plurality of horizontal compression devices. These compression devices may be mechanically or elastic-hydraulically operable. Furthermore, the evacuation nipple 24 is heat-sealed so as to form a closed nipple.

The invention is not restricted to the above described embodiments, but may be modified within the scope of the appended claims. For example, the transverse disc portion 20 of the abutment member need not be parallel to the transverse wall 15 of the end-piece 13, but instead can form an acute angle therewith.

I claim:

1. A method for manufacturing a container filled with a product, said container comprising a substantially tubular body portion having a predetermined diameter, a first end and a second end, a first end piece for closing said first end of said tubular body portion, and a second end piece for closing said second end of said tubular body portion, said second end piece including a transverse end wall having a diameter slightly less than said predetermined diameter, said method comprising closing said first end of said tubular body portion with said first end piece, introducing said product into said second end of said tubular body portion, partially introducing said second end piece to a position only partially projecting into said second end of said tubular body portion, softening said second end of said tubular body portion and a corresponding portion of said second end piece intended for weldable contact with said second end of said tubular body portion, contacting said transverse end wall of said second end piece with an abutment member having a diameter slightly less than said diameter of said transverse end wall, said abutment member including a distal portion for directly contacting said transverse end wall, cooling said abutment member with a cooling medium, and thereby indirectly cooling said distal portion of said abutment member to thereby prevent said abutment member from adhering to said transverse end wall, and closing said second end of said tubular body portion by contacting said second end piece with said second end of said tubular body portion through relative displacement between said abutment member and said tubular body portion.

2. The method of claim 1 wherein said tubular body portion comprises thin-walled plastic.

3. The method of claim 2 wherein said thin-walled plastic comprises a laminated plastic.

4. The method of claim 1 wherein said cooling medium comprises a liquid cooling medium.

5. The method of claim 4 wherein said liquid cooling medium comprises water.

6. The method of claim 1 wherein said abutment member includes a stem portion carrying said distal portion, said stem portion including conduit means, and said method including flowing said cooling medium through said conduit means in said stem portion of said abutment member.

7. The method of claim 1 wherein said cooling medium comprises a cooling gas.

8. The method of claim 7 wherein said cooling gas comprises air.

9. The method of claim 6 wherein said cooling medium comprises a cooling gas.

10. The method of claim 9 wherein said abutment member includes nozzle means directed away from said distal portion of said abutment means, and said method includes withdrawing said cooling gas from said abutment means through said nozzle means.

11. The method of claim 1 including evacuating said tubular body portion during said closing of said second end of said tubular body portion.

12. The method of claim 11 wherein said second end piece includes a central nipple, and said method includes evacuating said tubular body portion through said central nipple.

13. Apparatus for manufacturing a container filled with a product, said container comprising a substantially tubular body portion having a predetermined diameter, a first end, and a second end, a first end piece for closing said first end of said tubular body portion, a second end piece for closing said second end of said tubular body portion, said second end piece including a transverse end wall having a diameter slightly less than said predetermined diameter, said apparatus comprising placement means for placing said second end piece into an intermediate position only partially projecting into said second end of said tubular body portion, heating means for heating and softening said second end of said tubular body portion and a corresponding portion of said second end piece intended for weldable contact with said second end of said tubular body portion, abutment means for contacting said transverse end wall of said second end piece, said abutment means including a distal portion having a diameter slightly less than said diameter of said transverse end wall for directly contacting said transverse end wall of said second end piece and a stem portion carrying said distal portion, whereby said second end of said tubular body portion can be sealably closed by relative displacement between said abutment means and said tubular body portion, and cooling means for indirectly cooling said distal portion of said abutment means and thereby preventing said abutment means from adhering to said transverse end wall.

14. The apparatus of claim 13 wherein said tubular body portion comprises thin-walled plastic.

15. The apparatus of claim 14 wherein said thin-walled plastic comprises a laminated plastic.

16. The apparatus of claim 13 wherein said heating means includes means for supplying a gas at elevated temperature.

17. The apparatus of claim 13 wherein said stem portion of said abutment means includes conduit means for flowing a cooling medium through said stem portion of said abutment means.

18. The apparatus of claim 17 wherein said cooling medium comprises a cooling liquid.

19. The apparatus of claim 17 wherein said cooling medium comprises a cooling gas.

20. The apparatus of claim 19 wherein said abutment means includes nozzle means directed away from said distal portion of said abutment means whereby said cooling gas can be withdrawn from said abutment means through said nozzle means.

21. The apparatus of claim 13 including evacuation means for evacuating said tubular body portion during said closing of said second end of said tubular body portion.

22. The apparatus of claim 13 wherein said distal portion of said abutment means includes a flange portion arranged circumferentially around the perimeter of said distal portion of said abutment means.

23. The apparatus of claim 22 wherein said flange portion of said abutment means is made from a ceramic material.

* * * * *